United States Patent
Timsjo et al.

(10) Patent No.: US 9,239,665 B2
(45) Date of Patent: Jan. 19, 2016

(54) DYNAMIC FACEPLATES FOR MULTIPLE OBJECTS

(71) Applicant: ABB Research Ltd., Zurich (CH)

(72) Inventors: Susanne Timsjo, Vasteras (SE); Martin Olausson, Vasteras (SE)

(73) Assignee: ABB Research Ltd., Zurich (CH)

(*) Notice: Subject to any disclaimer, the term of this patent is extended or adjusted under 35 U.S.C. 154(b) by 0 days.

(21) Appl. No.: 14/076,574

(22) Filed: Nov. 11, 2013

(65) Prior Publication Data

US 2014/0075392 A1    Mar. 13, 2014

Related U.S. Application Data

(63) Continuation of application No. PCT/EP2011/059702, filed on Jun. 10, 2011.

(51) Int. Cl.
| | |
|---|---|
| *G06F 3/048* | (2013.01) |
| *G06F 3/0482* | (2013.01) |
| *G06F 9/44* | (2006.01) |
| *G05B 19/418* | (2006.01) |

(52) U.S. Cl.
CPC ............ *G06F 3/0482* (2013.01); *G05B 19/418* (2013.01); *G06F 9/4443* (2013.01); *G05B 2219/31472* (2013.01)

(58) Field of Classification Search
CPC .............................. G06F 3/0482; G06F 3/0483
USPC .......................................................... 715/841
See application file for complete search history.

(56) References Cited

U.S. PATENT DOCUMENTS

| | | | | |
|---|---|---|---|---|
| 4,570,217 | A | | 2/1986 | Allen et al. |
| 5,414,809 | A | * | 5/1995 | Hogan et al. ................... 715/765 |
| 5,692,213 | A | * | 11/1997 | Goldberg et al. ............. 715/203 |
| 5,880,725 | A | * | 3/1999 | Southgate ...................... 715/790 |
| 6,111,573 | A | * | 8/2000 | McComb et al. .............. 715/763 |

(Continued)

FOREIGN PATENT DOCUMENTS

| | | |
|---|---|---|
| AU | 2008243141 A1 | 5/2010 |
| EP | 1975782 A1 | 10/2008 |
| WO | 2005029312 A1 | 3/2005 |

OTHER PUBLICATIONS

International Preliminary Report on Patentability Application No. PCT/EP2011/059702 Completed: Jul. 11, 2013 15 pages.

(Continued)

*Primary Examiner* — Doon Chow
*Assistant Examiner* — Conrad Pack
(74) *Attorney, Agent, or Firm* — Whitmyer IP Group LLC

(57) ABSTRACT

A method in a UI of a process control system is disclosed. The UI is configured to be displayed on an electronic visual display unit connectable to the process control system. The UI is adapted to visually indicate a plurality of components included in at least a part of a process controlled by the process control system. At least one sub-UI, such as a faceplate, is generated, each sub-UI corresponding to a respective component of the plurality of components. The at least one sub-UI is displayed on the display unit. Each of the at least one sub-UI is adapted such that a number of operation information and/or control elements visually indicated in each sub-UI when the at least one sub-UI is displayed on the display unit depends on the number of sub-UIs that are displayed on the display unit at the same time. Furthermore, such a UI is disclosed.

11 Claims, 6 Drawing Sheets

(56) References Cited

U.S. PATENT DOCUMENTS

| | | | |
|---|---|---|---|
| 7,036,089 B2* | 4/2006 | Bauer | 715/827 |
| 7,392,483 B2* | 6/2008 | Wong et al. | 715/746 |
| 7,949,954 B1 | 5/2011 | Jezek, Jr. | |
| 2001/0043235 A1* | 11/2001 | Best et al. | 345/781 |
| 2002/0118214 A1* | 8/2002 | Card et al. | 345/619 |
| 2003/0025737 A1* | 2/2003 | Breinberg | 345/801 |
| 2003/0151629 A1* | 8/2003 | Krebs et al. | 345/810 |
| 2004/0056894 A1* | 3/2004 | Zaika et al. | 345/762 |
| 2005/0140574 A1* | 6/2005 | Tamura | 345/9 |
| 2006/0005207 A1* | 1/2006 | Louch et al. | 719/328 |
| 2006/0236264 A1* | 10/2006 | Cain et al. | 715/788 |
| 2007/0239291 A1* | 10/2007 | Wayland et al. | 700/83 |
| 2008/0155437 A1 | 6/2008 | Morris | |
| 2008/0244449 A1 | 10/2008 | Morrison et al. | |
| 2009/0089668 A1* | 4/2009 | Magnani et al. | 715/273 |
| 2009/0157200 A1 | 6/2009 | Hams | |
| 2009/0300146 A1* | 12/2009 | Park et al. | 709/219 |

OTHER PUBLICATIONS

International Search Report and Written Opinion of the International Searching Authority Application No. PCT/EP2011/059702 Completed: Nov. 3, 2011; Mailing Date: Nov. 17, 2011 10 pages.

* cited by examiner

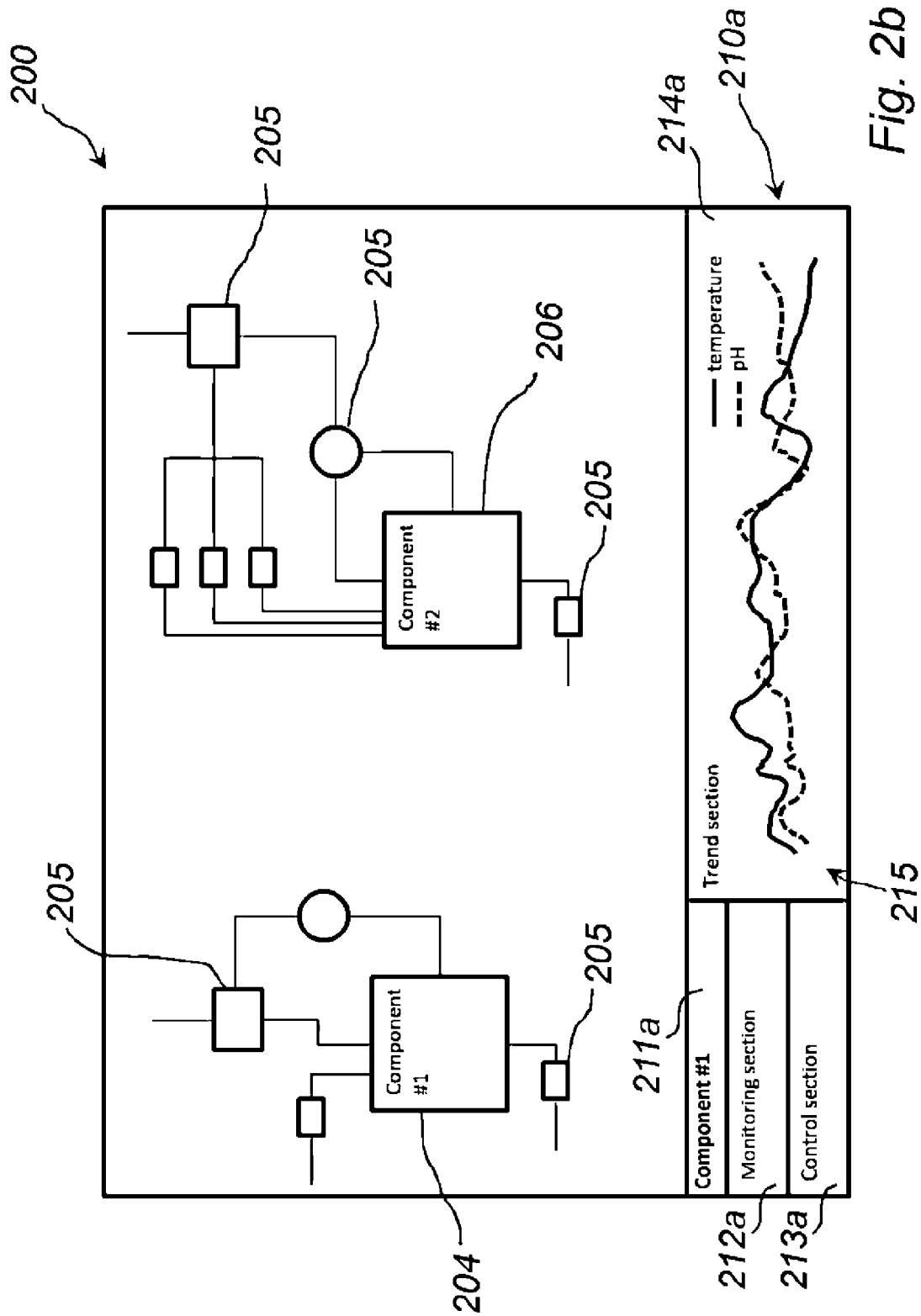

DYNAMIC FACEPLATES FOR MULTIPLE OBJECTS

FIELD OF THE INVENTION

The present invention generally relates to process control systems for controlling a process. Specifically, the present invention relates to a method in a user interface (UI) of a process control system and a UI of a process control system.

BACKGROUND OF THE INVENTION

Processing facilities are often managed using process control systems. In process control systems for controlling and/or monitoring an industrial process, the operator typically controls/monitors the entire process or different parts of the process by means of one or more user interfaces (UIs), for example constituted by one or more graphic windows displayed on a display screen, where each graphic window may display process graphics. Such UIs may enable the operator to monitor the status of the different components of the process and/or control the operation of individual components of the process by means of user input provided to the UI. Such operations typically comprise operation of motors, valves and other industrial equipment in the processing facilities, alarm management, etc. Providing user input to the UI may for example comprise providing instructions to a component of the process by means of a pointing device, such as a computer mouse, for manipulating objects in the UI. For example, appropriate parts or objects in a graphic window displayed on a display screen may be selected and manipulated by means of a pointing device.

A UI such as described above may be adapted to visually indicate to the user or operator the positions of the components included in the process relatively to each other. Thus, the UI may provide a display of a schematic arrangement of the components for providing the user with an overview of the process or a part of the process.

Hence, such UIs may include process schematics that graphically illustrate the process being controlled. Such UIs may also include graphical faceplates, which typically can be displayed over a process schematic or graphics and are used to control a process. Amongst others, faceplates may be used by an operator via the UI to among other things set desired process targets and monitor discrepancies in process parameters relatively to process target parameters.

Faceplates are typically presented to the operator or user in so called popup windows on a workstation display device such as a computer monitor. The faceplates are generally displayed on the display device overlaid or superimposed on the process graphics. In some applications or circumstances, it may be desirable to have several faceplates displayed on the display device simultaneously, for example for having quick access to specific operations and for comparing contents of different faceplates with each other. This may allow the user to compare e.g. status and available operations of different components of the process on a more detailed level compared to that available from the process graphics alone.

In particular when working with several faceplates simultaneously, the user may become unsure where on the screen of the display device the faceplates will appear. The screen of the display device may become cluttered as a result of several faceplates appearing on the screen within corresponding popup windows, which may cover important underlying process graphics.

SUMMARY OF THE INVENTION

In view of the above discussion, a concern of the present invention is to provide an improved method in a process control system and an improved user interface (UI) of a process control system with regards to user friendliness.

Another concern of the present invention is to provide a method and a UI for facilitating working with several faceplates simultaneously.

To address one or more of these concerns and other concerns, a method and a UI in accordance with the independent claims are provided. Preferred embodiments are defined by the dependent claims.

According to a first aspect of the present invention, there is provided a method in a UI of a process control system.

The UI is configured to be displayed on an electronic visual display unit connectable to the process control system. The UI is adapted to visually indicate a plurality of components included in at least a part of a process controlled by the process control system, where each component of the plurality of components is associated with a set having a plurality of elements, each of which elements is associated with operation of the component.

The method comprises generating at least one sub-UI.

Each sub-UI corresponds to a respective component of the plurality of components.

Each sub-UI is adapted to controllably visually indicate at least some of the elements of the set associated with the corresponding component with regards to selection of elements of the set to be visually indicated in the sub-UI.

The at least one sub-UI is displayed on the display unit.

Each of the at least one sub-UI is adapted such that the number of elements visually indicated in each sub-UI when the at least one sub-UI is displayed on the display unit depends on the number of sub-UIs that are displayed on the display unit at the same time.

Hence, each sub-UI may be controlled with regards to selection of elements of the set corresponding to the sub-UI, which elements are to be visually indicated in the sub-UI.

Alternatively or optionally, a sub-UI may correspond to more than one component of the plurality of components.

A sub-UI may for example comprise a faceplate adapted to enable a user to set desired process target parameters of the component of the process corresponding to the sub-UI and/or monitor discrepancies in process parameters relatively to process target parameters for the component corresponding to the sub-UI.

Hence, the elements of a set corresponding to a component, each of which elements is associated with operation of the component, may be associated with control and/or monitoring of the respective component. The elements may include at least one of operational state of and available operations performable on the respective component, or in other words, functionalities and/or information elements of the respective component.

By a method according to the present invention, the displaying of several sub-UIs, e.g. faceplates, on the display unit simultaneously can be performed such that the number of functionalities and/or information elements for the corresponding component included in each sub-UI is dynamically adapted depending on how many sub-UIs that are displayed on the display unit simultaneously. In other words, each sub-UI can be adapted so as to selectively display only a certain subset of the elements of the set associated with the corresponding component, depending on how many sub-UIs that are displayed on the display unit simultaneously.

Functionalities and/or information elements for a component corresponding to a sub-UI may for example comprise operational status and available operations of the components.

For example, in case only a first sub-UI of a corresponding component is displayed on the display unit at a given moment, the first sub-UI may be displayed with a first set of functionalities and/or information elements. The user may then cause a second sub-UI, which may correspond to another component, to be generated and displayed on the display unit by means of user input provided to the UI, e.g. by means of selecting the other sub-UI with a pointing device. Since there are now two sub-UIs displayed on the display unit at the same time, both of the first and second sub-UIs are dynamically adapted so as to be displayed in a 'reduced' display mode with respect to when only the first sub-UI was displayed. Namely, both of the first and second sub-UI are dynamically adapted so as to be displayed with a second set of functionalities and/or information elements. The second set of functionalities and/or information elements may be smaller than the first set of functionalities and/or information elements.

The adaptation of the first and second sub-UIs may be performed substantially instantaneously or immediately after the user has caused the second sub-UI to be generated and displayed on the display unit.

Then, as possibly further sub-UIs are caused to be generated and displayed on the display unit, each of the displayed sub-UIs is dynamically adapted so as to be displayed in a further reduced display mode depending on the number of sub-UIs that are displayed on the display unit at the same time.

Such a configuration may allow for displaying only the most common set of functionalities and/or information elements in each sub-UI when the number of sub-UIs that are displayed on the display unit at the same time becomes relatively large. In this manner, user friendliness may be increased compared to 'fixed mode' displaying of each sub-UI irrespective of how many sub-UIs that are displayed on the display unit at the same time. Namely, by displaying only the most common or desired set of functionalities and/or information elements in each sub-UI when the number of sub-UIs that are displayed on the display unit at the same time is relatively large, cluttering up a screen of the display device with a large number of objects overlying the process graphics may be mitigated or even eliminated, which objects may possibly cover important underlying process graphics.

According to a second aspect of the present invention, there is provided a UI of a process control system. The UI is configured to be displayed on an electronic visual display unit connectable to the process control system.

The UI is adapted to visually indicate a plurality of components included in at least a part of a process controlled by the process control system, each component of the plurality of components being associated with a set having a plurality of elements, each of which elements is associated with operation of the component.

The UI is configured to generate at least one sub-UI, each sub-UI corresponding to a respective component of the plurality of components and each sub-UI being adapted to controllably visually indicate at least some of the elements of the set associated with the corresponding component with regards to selection of elements of the set to be visually indicated in the sub-UI.

The UI is configured to display the at least one sub-UI on the display unit.

The UI is configured to adapt each of the at least one sub-UI such that the number of elements visually indicated in each sub-UI when the at least one sub-UI is displayed on the display unit depends on the number of sub-U Is that are displayed on the display unit at the same time.

Each of the at least one sub-UIs may be controllable with regards to size of the sub-UI when displayed on the display unit.

Each of the at least one sub-UIs may be adapted such that the size of the sub-UI as displayed on the display unit depends on the number of sub-UIs that are displayed on the display unit at the same time.

Each of the at least one sub-UI may be adapted such that the size of each of the at least one sub-UI as displayed on the display unit decreases with the number of sub-UIs that are displayed on the display unit at the same time.

The at least one sub-UI may be displayed on the display unit within a predetermined region of the UI and/or a dedicated area on the display unit.

By such a configuration, the user may be aware of where on the screen of the display device any sub-UIs or faceplates will appear or are likely to appear. This may increase user friendliness and/or user intuitivity.

The predetermined region may be a region of the UI that is dedicated for displaying of the sub-UIs, i.e. a region where the sub-UIs are displayed on the display unit overlaid or superimposed on the UI.

The UI may be adapted such that the visual indications of the plurality of components are displayed on regions of the UI different from the above-mentioned predetermined region, and/or such that the predetermined region is for exclusive use for displaying of the at least one sub-UI.

By such a configuration, hiding of important process graphics may be mitigated or even eliminated since the sub-UIs can be displayed in a dedicated region of the UI. Process graphics different from that of the sub-UIs can be displayed in other regions of the UI different from the predetermined region.

Each of the at least one sub-UI may be adapted such that the size of the sub-UI as displayed on the display unit within the predetermined region of the UI depends on the number of sub-UIs that are displayed on the display unit at the same time.

For example, each of the at least one sub-UI may be adapted such that the size of each of the at least one sub-UI as displayed on the display unit, possibly within the predetermined region of the UI, decreases with the number of sub-UIs that are displayed on the display unit at the same time.

Additionally or optionally, each of the at least one sub-UI may be adapted such that the number of elements visually indicated in each sub-UI when the at least one sub-UI is displayed on the display unit, possibly within the predetermined region of the UI, decreases with the number of sub-UIs that are displayed on the display unit at the same time.

At least one component indicated by the UI may be selected by providing user input to the UI.

The at least one sub-UI may be generated such that the at least one sub-UI corresponds to respective ones of the selected at least one component.

At least two sub-UIs may be generated.

The at least two sub-UIs may be displayed on the display unit within the predetermined region of the UI such that each of the at least two sub-UIs is displayed adjacent to at least one of the other sub-UIs.

Each of the at least two sub-UIs may be adapted such that the aggregated or total size of all of the sub-UIs as displayed on the display unit within the predetermined region of the UI is substantially equal or equal to the size of the predetermined region of the UI as displayed on the display unit.

Possibly, the at least two sub-UIs may be displayed on the display unit within the predetermined region of the UI such that the at least two sub-UIs are substantially non-overlapping when displayed on the display unit.

By non-overlapping sub-UIs it may mean that the content-filled portions of the sub-UIs, e.g. the portions of the sub-UIs including graphics objects that can be manipulated and/or monitored by a user or operator, are non-overlapping. Hence, some overlap between the sub-UIs, e.g. overlap of portions of the respective sub-UIs that do not contain objects that can be manipulated and/or monitored by a user, may be possible.

For each component of the plurality of components, the set associated therewith may be retrieved.

Change in operational state of at least one of the components may be sensed by comparing the elements of the respective set associated with the at least one of the components with the elements of a previously retrieved set associated with the at least one of the components.

On a condition that change has been sensed, the sub-UI corresponding to the respective at least one of the components for which change in operational state has been sensed may be re-generated. The sub-UI corresponding to the respective at least one of the components for which change in operational state has been sensed may be re-displayed on the display unit.

By such a configuration, a sub-UI may be dynamically updated responsive to changes in the operational state of the corresponding component, e.g. to reflect the changes in the operational state of the corresponding component.

Such dynamic updating may be performed automatically by means of monitoring change in operational state of at least one of the components, i.e. repeatedly performing sensing of change in operational state of at least one of the components.

The set associated with each component of the plurality of components may be retrieved at least twice.

The elements of the set for a respective component may be retrieved from the process control system and/or from the component itself. For example, the elements of the set for the component may be determined by measurements and/or monitoring performed at and/or in the component. Hence, elements of the set may indicate measurement data for the respective component, for example one or more component process parameters as a function of time.

The UI may be adapted to enable the user to control the operational state of the respective components by means of user input provided to the UI.

A sub-UI may be adapted to enable the user to control the operational state of the component corresponding to the sub-UI by means of user input provided to the sub-UI.

According to a third aspect of the present invention, there is provided a computer program product adapted to, when executed in a processor unit, perform a method according to the present invention.

According to a fourth aspect of the present invention, there is provided a computer-readable storage medium on which there is stored a computer program product adapted to, when executed in a processor unit, perform a method according to the present invention.

According to a fifth aspect of the present invention, there is provided a process control system comprising a UI according to the present invention.

Further objects and advantages of the present invention are described in the following by means of exemplifying embodiments.

It is noted that the present invention relates to all possible combinations of features recited herein. Further features of, and advantages with, the present invention will become apparent when studying the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings, in which:

FIGS. 2a-2c are schematic views of UIs according to exemplifying embodiments of the present invention;

In the accompanying drawings, the same reference numerals denote the same or similar elements throughout the views.

DETAILED DESCRIPTION OF THE INVENTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the present invention to those skilled in the art. Furthermore, like numbers refer to like or similar elements or components throughout. The steps of any method disclosed herein do not have to be performed in the exact order disclosed, unless explicitly stated.

Figure 1A:
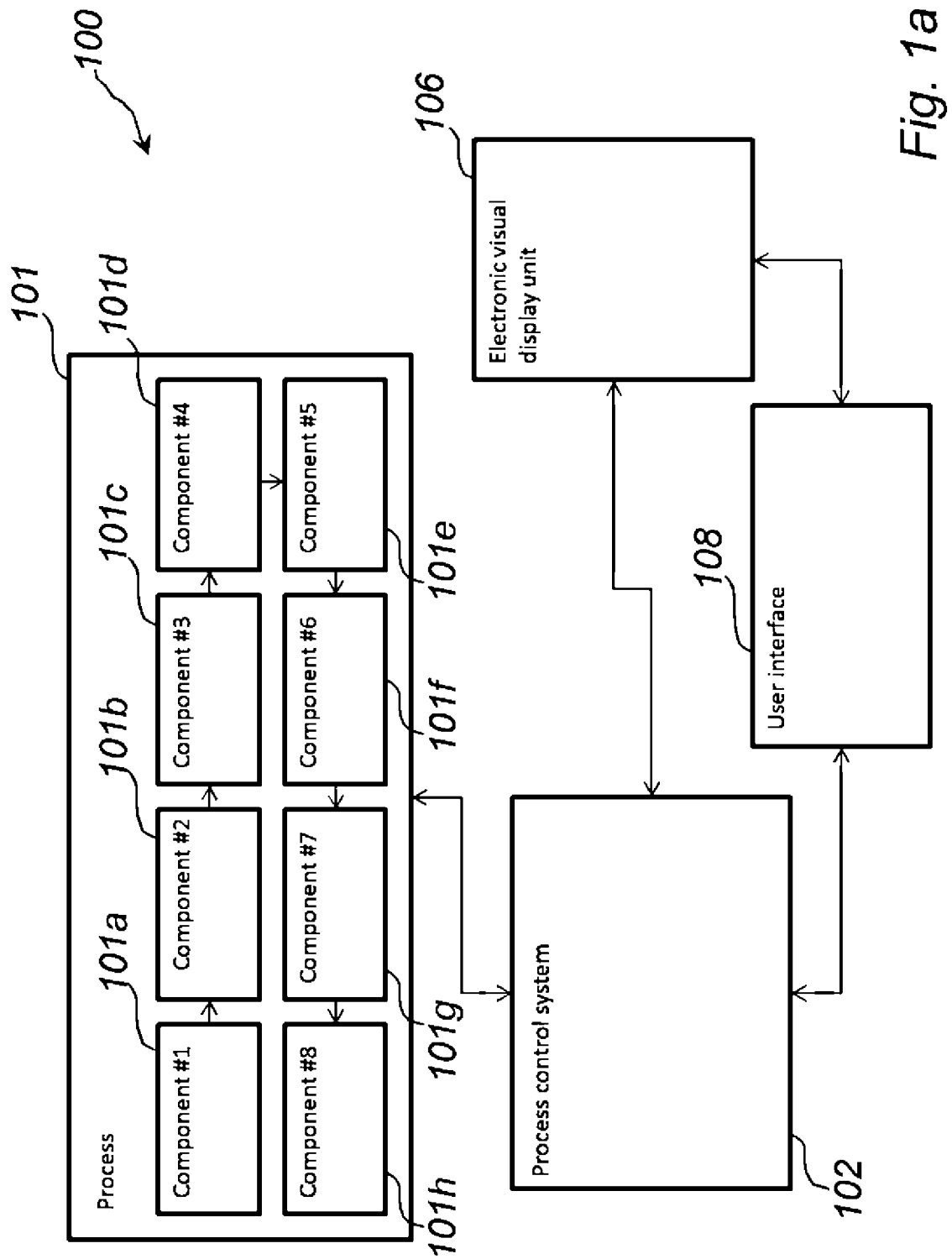
FIG. 1a is a schematic block diagram of a system in accordance with an exemplifying embodiment of the present invention.

Referring now to FIG. 1a, there is shown a schematic block diagram of a system 100 in accordance with an exemplifying embodiment of the present invention.

The system 100 comprises a process 101 comprising several components, sub-processes, or steps 101a-101h. Each component 101a-101h may refer to a specific device that is included in the overall installation embodying the process 101. A component 101a-101h of the process 101 may refer to a specific step or several steps that are part of the process 101.

In FIG. 1a it is indicated that the process components 101a-101h are processed or executed in a serial manner one after the other. However, this is merely according to one example; the process 101 can comprise other configurations. For example, the process 101 may be embodied in a machine with the components of the process being components or parts of the machine operating in concert or independently of each other. According to another example, the process 101 is a process taking place in an industrial installation and/or in an installation for production, transmission and/or distribution of energy.

In FIG. 1a there is shown eight components of the process 101. The number of components of the process 101 depicted in FIG. 1a is according to an example. It is to be understood that the process 101 may comprise any number of components being a positive integer, such as one, two, three, four, five, ten, fifteen, twenty, or a hundred or more components.

The process 101 is controlled by a process control system 102. To this end, the process control system 102 may be adapted to transmit control signals to and retrieve control signals from the process 101 or from each of the components 101a-101h for monitoring the operational status of and/or controlling the operation of the process 101 or each of the components 101a-101h.

Each component 101a-101h may be associated with at least one signal indicating an operational state of the respective component 101a-101h. The at least one signal may for example be generated by the process control system 102 or by the component 101a-101h itself, and communicated to the process control system 102. The at least one signal associated with a component 101a-101h may for example comprise data measured at the component 101a-101h indicative of an operational state thereof.

The process control system 102 comprises a user interface (UI) 108 according to an embodiment of the present invention. The UI 108 is adapted to visually indicate the components 101a-101h included in the process 101 controlled by the process control system 102. The system 102 comprises an electronic visual display unit 106 configured to display the UI 108 of the process control system 102. The UI 108 may be adapted to enable the user, or operator of the process 101, to control the operational state of the components 101a-101h by means of user input provided to the UI 108.

Figure 1B:
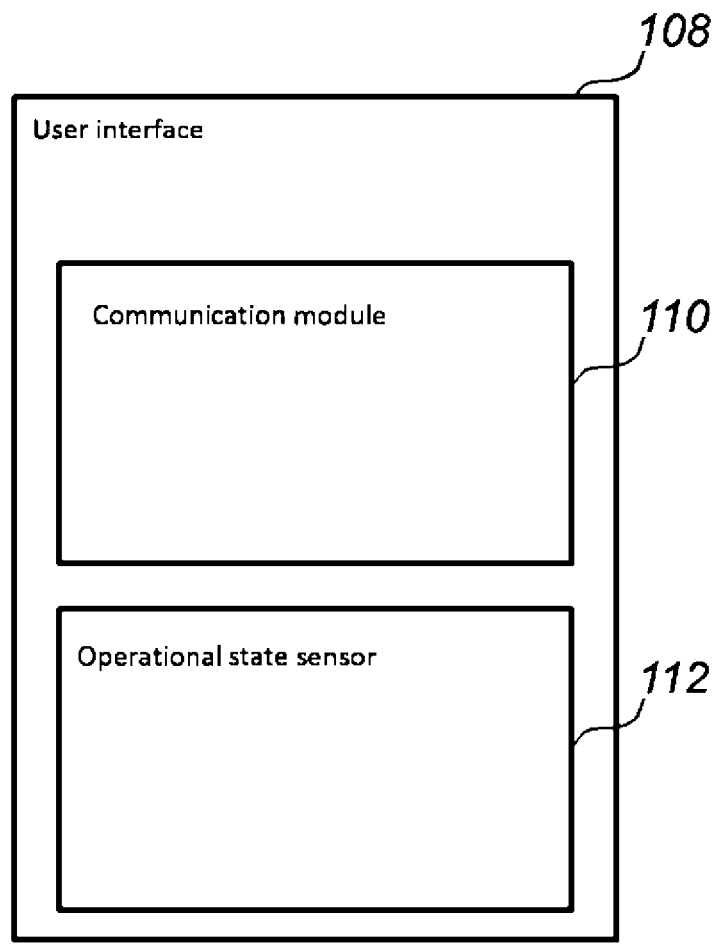
FIG. 1b is a schematic block diagram of a user interface (UI) in accordance with an exemplifying embodiment of the present invention.

Referring now to FIG. 1b, there is shown a schematic block diagram of a UI 108 in accordance with an exemplifying embodiment of the present invention.

Further with reference to FIG. 1a, the UI 108 is adapted to visually indicate the components 101a-101h included in the process 101. Each component 101a-101h of the components 101a-101h is associated with a set having a plurality of elements, each of which elements is associated with operation of the respective component 101a-101h.

The UI 108 is adapted to generate at least one sub-UI (not shown in FIG. 1b), each sub-UI corresponding to a respective component 101a-101h of the components 101a-101h, and each sub-UI being adapted to controllably visually indicate at least some of the elements of the set associated with the corresponding component 101a-101h, with regards to selection of elements of the set to be visually indicated in the sub-UI.

The UI 108 is adapted to display the at least one sub-UI on the display unit 106.

The UI 108 is configured to adapt each of the generated at least one sub-UI such that the number of elements visually indicated in each sub-UI when the at least one sub-UI is displayed on the display unit 106 depends on the number of sub-UIs that are displayed on the display unit 106 at the same time.

The UI 108 comprises a communication module 110 adapted to, for each component 101a-101h, retrieve the set associated therewith.

The UI 108 comprises an operational state sensor 112 adapted to sense change in operational state of one of the components 101a-101h by comparing the elements of the respective set associated with the component 101a-101h with the elements of a previously retrieved set associated with the same component 101a-101h. Hence, the set associated with a component 101a-101h may be retrieved at least twice.

On a condition that change is sensed by the operational state sensor 112, the UI 108 is adapted to re-generate the sub-UI corresponding to the component 101a-101h for which change in operational state has been sensed. The UI 108 may then re-display the re-generated sub-UI on the display unit 106.

By such a configuration, a sub-UI may be dynamically updated responsive to changes in the operational state of the corresponding component 101a-101h, e.g. to reflect the changes in the operational state of the corresponding component 101a-101h.

As indicated in FIG. 1a, the elements of the set for a respective component 101a-101h can be retrieved from the process control system 102. Alternatively or optionally, the elements of the set for a respective component 101a-101h may be retrieved from the component 101a-101h itself.

The communication module 110 and/or the operational state sensor 112 may alternatively be arranged external to the UI 108, wherein the communication module 110 and/or the operational state sensor 112, respectively, is connectable to the UI 108.

Figure 2A:
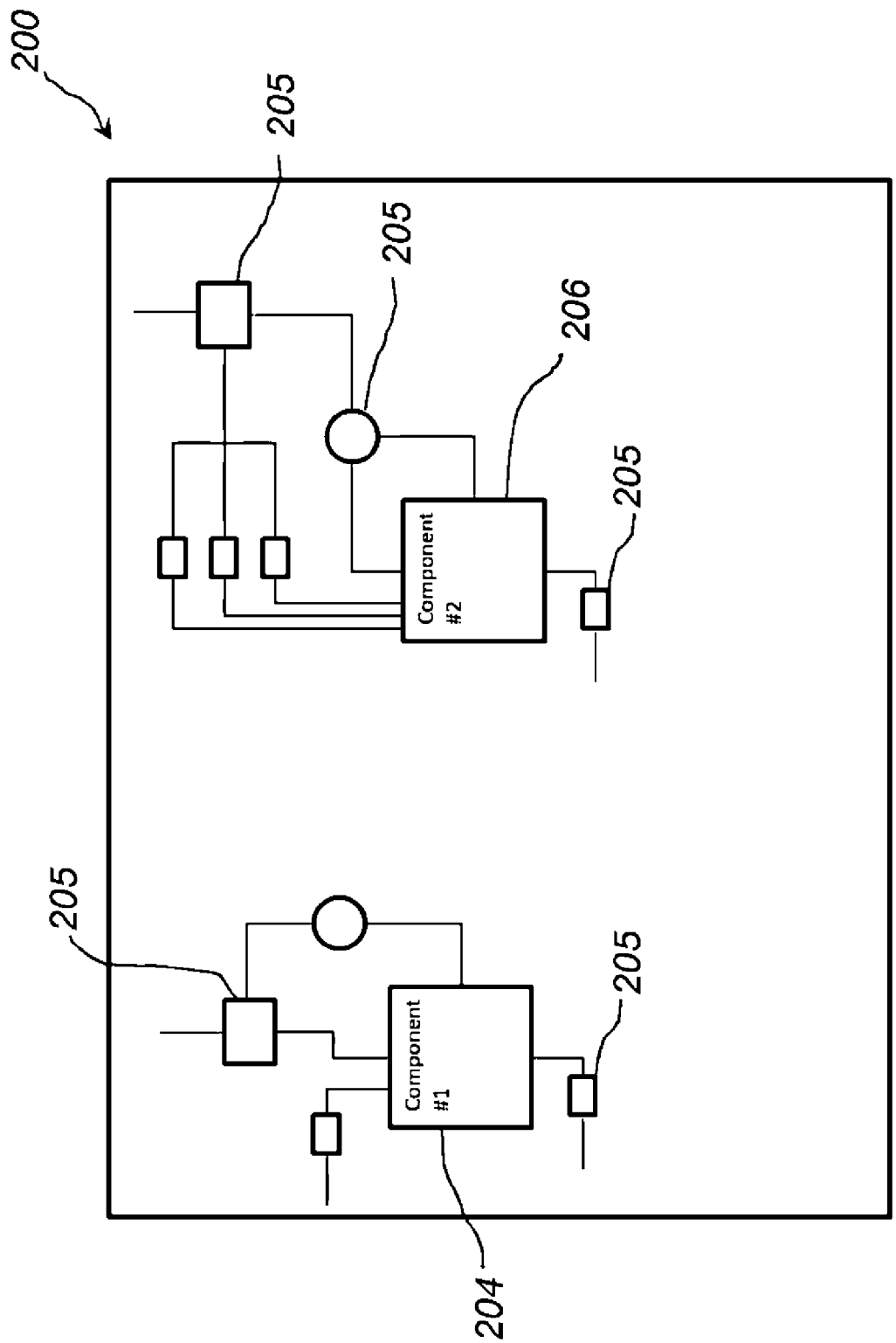

Referring now to FIG. 2a, there is shown a UI 200 according to an exemplifying embodiment of the present invention. The UI 200 is displayed on an electronic visual display unit or display screen (not shown in FIG. 2a). The UI 200 comprises a graphics window displaying process graphics of components 204, 205, 206 of an industrial process. The UI 200 may enable a user or operator to monitor the status of the different components 204, 205, 206 of the process and/or control the operation of individual components 204, 205, 206 by means of user input provided to the UI 200. Only a few of the components depicted in FIG. 2a are indicated by reference numerals 204, 205, 206. The process graphics schematically shown in the UI 200 are according to an example for illustrating principles of the present invention. Providing user input to the UI 200 may for example comprise providing instructions to a component 204, 205, 206 of the process indicated in the UI 200 by means of a pointing device, such as a computer mouse, for manipulating graphics objects in the UI 200. For example, appropriate portions of the graphic window 200 displayed on the display screen may be selected and manipulated using the computer mouse.

Each component 204, 205, 206 is associated with a set having a plurality of elements, each of which elements is associated with operation of the respective component 204, 205, 206.

The elements of a set corresponding to a component 204, 205, 206 may be associated with control and/or monitoring of the respective component 204, 205, 206. The elements of the set may include at least one of operational state of and available operations performable on the respective component 204, 205, 206, or in other words, functionalities and/or information elements of the respective component 204, 205, 206.

Referring now to FIG. 2b, there is shown a view of the UI 200 indicating a situation where the user or operator has caused a first sub-UI 210a to appear.

According to the depicted embodiment, the sub-UI 210a corresponds to component 204. The sub-UI 210a is generated responsive to the user selecting component 204 by providing user input to the UI 200.

The sub-UI 210a comprises a component identification section 211a which enables the user to identify which component the sub-UI 210a corresponds to, a monitoring section 212a which enables the user to monitor operational state of the component 204, a control section 213a which enables the user to control operational state of the component 204 by means of user input provided to the control section 213a, and a trend section 214a which enables the user to monitor process parameters relating to component 204 as a function of time. According to the example schematically shown in FIG. 2b, the trend section 214a enables the user to monitor a pH value and temperature value associated with the operation of component 204 as a function of time.

According to the depicted embodiment, the sub-UI 210a is displayed on the display unit within a predetermined region 215 of the UI 200.

Figure 2C:
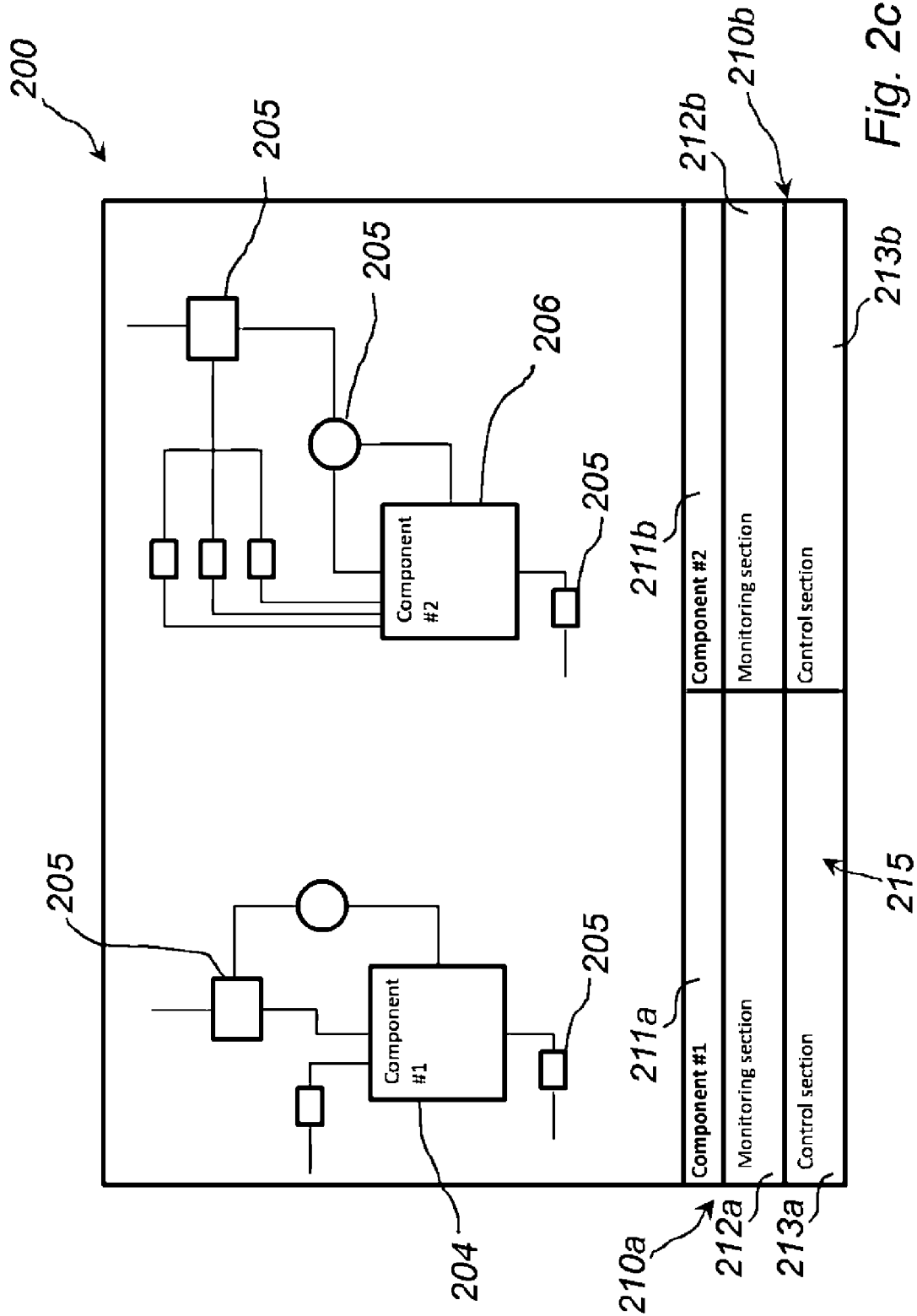

Referring now to FIG. 2c, there is shown a view of the UI 200 indicating a situation where the user or operator has caused a second sub-UI 210b to appear, while the first sub-UI 210a is still being displayed on the display unit.

According to the depicted embodiment, the sub-UI 210b corresponds to component 206. The sub-UI 210b is generated responsive to the user selecting component 206 by providing user input to the UI 200.

As can be seen in FIG. 2c, responsive to the generation of a second sub-UI 210b to be displayed on the display unit, the first sub-UI 210a is adapted to be displayed in a 'reduced' display mode as compared to in FIG. 2b where only the first sub-UI 210a of the first and second sub-UIs 210a, 210b is displayed on the display unit. Namely, the first sub-UI 210a now comprises the component identification section 211a, the monitoring section 212a and the control section 213a, but now with the trend section 214a shown in FIG. 2b being omitted as a result of there now being two sub-UIs 210a, 210b displayed on the display unit simultaneously.

The second sub-UI 210b is displayed adjacent to the first sub-UI 210a within the predetermined region 215.

The sub-UI 210b is displayed in the same display mode as the first sub-UI 210a so that the sub-UI 210b comprises a component identification section 211b which enables the user to identify which component the sub-UI 210b corresponds to, a monitoring section 212b which enables the user to monitor operational state of the component 206 and a control section 213b which enables the user to control operational state of the component 206 by means of user input provided to the control section 213b.

FIGS. 2b-2c illustrate a principle of the present invention of adapting each of generated sub-UIs 210a, 210b such that the number of elements visually indicated in each sub-UI 210a, 210b when it is displayed on the display unit depends on the number of sub-UIs 210a, 210b that are displayed on the display unit at the same time. Hence, as possibly additional sub-UIs to the sub-UIs 210a, 210b are caused to be generated and displayed on the display unit, each of the simultaneously displayed sub-UIs is dynamically adapted so as to be displayed in a further reduced display mode depending on the number of sub-UIs that are displayed on the display unit at the same time. That is, each of the simultaneously displayed sub-UIs is dynamically adapted so as to adapt the number of elements visually indicated in each sub-UI on basis of the number of sub-UIs that are displayed on the display unit simultaneously.

Figure 3:
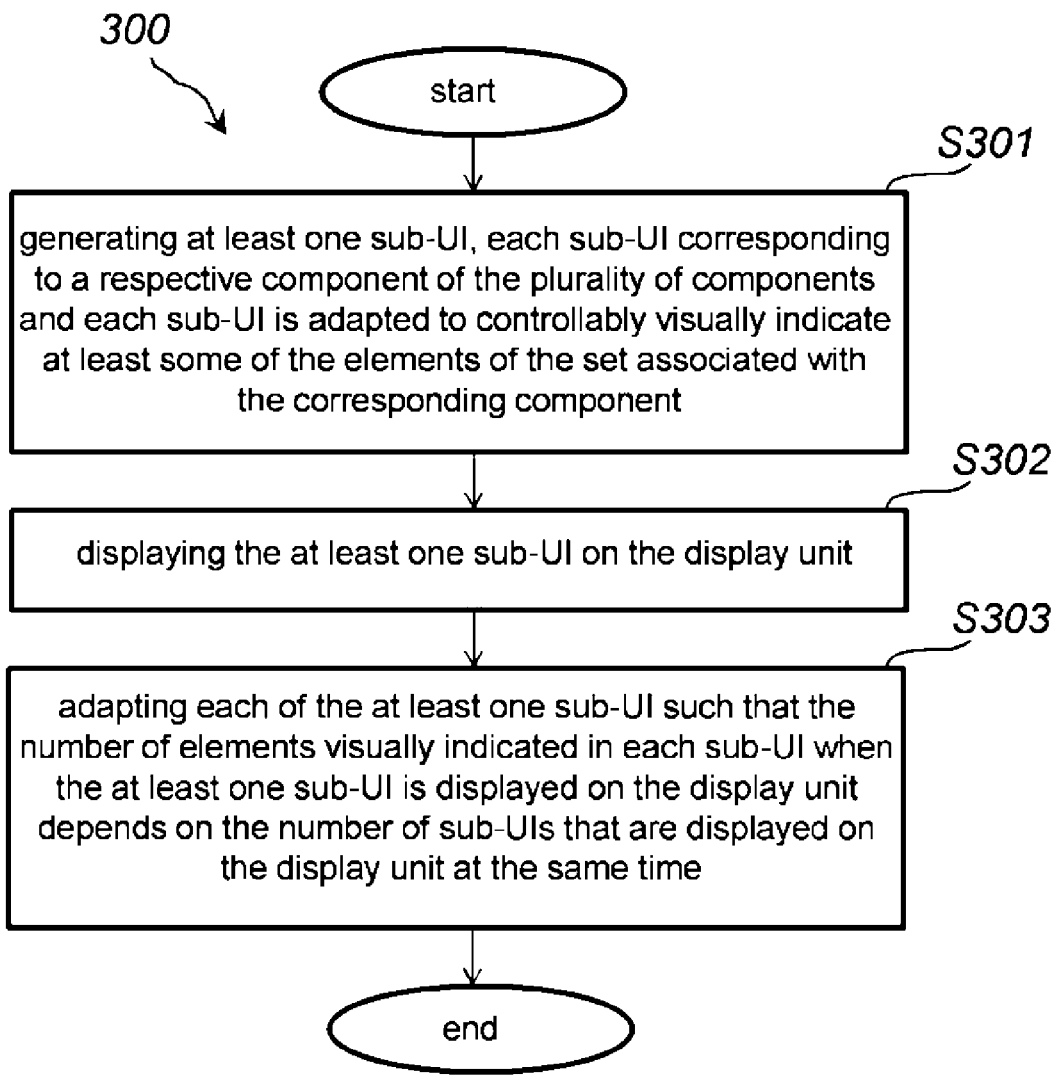
FIG. 3 is a schematic flowchart of method steps in accordance with an exemplifying embodiment of the present invention.

Referring now to FIG. 3, there is shown a schematic flowchart of a method 300 according to an exemplifying embodiment of the present invention.

The method 300 is carried out in a UI of a process control system. The UI is configured to be displayed on an electronic visual display unit connectable to the process control system. The UI is adapted to visually indicate a plurality of components included in at least a part of a process controlled by the process control system, each component of the plurality of components being associated with a set having a plurality of elements, each of which elements is associated with operation of the component.

The method 300 comprises generating, S301, at least one sub-UI.

Each sub-UI corresponds to a respective component of the plurality of components and each sub-UI is adapted to controllably visually indicate at least some of the elements of the set associated with the corresponding component with regards to selection of elements of the set to be visually indicated in the sub-UI.

The at least one sub-UI is displayed, S302, on the display unit.

Each of the at least one sub-UI is adapted, S303, such that the number of elements visually indicated in each sub-UI when the at least one sub-UI is displayed on the display unit depends on the number of sub-UIs that are displayed on the display unit at the same time.

Figure 4:
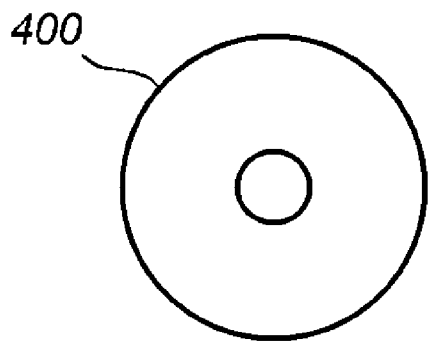
FIG. 4 is a schematic view of a computer-readable storage medium according to an exemplifying embodiment of the present invention.

Referring now to FIG. 4, there is shown a schematic view of a computer-readable storage medium 400 according to an exemplifying embodiment of the present invention, the storage medium 400 comprising a Digital Versatile Disc (DVD). On the computer-readable storage medium there is stored a computer program product adapted to, when executed in a processor unit, e.g. a general purpose processor in a computer, perform a method according to the present invention.

Although only one type of computer-readable storage medium has been described above with reference to FIG. 4, the present invention encompasses embodiments employing any other suitable type of computer-readable storage medium, such as, but not limited to, a non-volatile memory, a hard disk drive, a CD, a floppy disk, a flash memory, magnetic tape, a USB stick, a Zip drive, etc.

In conclusion, there is disclosed a method in a UI of a process control system. The UI is configured to be displayed on an electronic visual display unit connectable to the process control system. The UI is adapted to visually indicate a plurality of components included in at least a part of a process controlled by the process control system. At least one sub-UI, such as a faceplate, is generated, each sub-UI corresponding to a respective component of the plurality of components. The at least one sub-UI is displayed on the display unit. Each of the at least one sub-UI is adapted such that a number of operation information and/or control elements visually indicated in each sub-UI when the at least one sub-UI is displayed on the display unit depends on the number of sub-UIs that are displayed on the display unit at the same time. There is also disclosed such a UI.

While the present invention has been illustrated and described in detail in the appended drawings and the foregoing description, such illustration and description are to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

What is claimed is:

1. A method performed in a user interface, UI, of a process control system, the UI being configured to be displayed on an electronic visual display unit connectable to the process control system, the method comprising:

displaying visual indications of a plurality of components included in at least a part of a process controlled by the process control system on the display unit, each component of the plurality of components being associated with a set having a plurality of elements, each of which elements is associated with operation of the component;

generating at least one sub-UI, each sub-UI corresponding to a respective component of the plurality of components, each sub-UI being adapted to controllably visually indicate at least some of the elements of the set associated with the corresponding component and to enable a user to control an operational state of the corresponding component by means of user input provided to the sub-UI;

displaying the at least one sub-UI on the display unit within a predetermined region of the UI, the predetermined region configured to display exclusively the at least one sub-UI, wherein all of the at least one sub-UI of any number displayed in the UI completely fills the predetermined region;

generating and displaying at least two of the at least one sub-UI within the predetermined region;

adapting each of the at least one sub-UI such that the size of each of the at least one sub-UI as displayed on the display unit within the predetermined region of the UI decreases with the number of sub-UIs that are displayed simultaneously on the display unit; and adapting each of the at least one sub-UI such that a number of elements visually indicated in each sub-UI when the at least one sub-UI is displayed on the display unit depends on the number of sub-UIs that are displayed simultaneously on the display unit, and such that, for each of the at least one sub-UI, a number of available operations that can be performed on the corresponding component by means of user input provided to the sub-UI depends on the number of sub-UIs that are displayed simultaneously on the display unit.

2. The method according to claim 1, further comprising:
displaying the at least two of the at least one sub-UI within the predetermined region of the UI such that the at least two sub-UIs are displayed adjacent to each other.

3. The method according to claim 1, further comprising:
adapting each of the at least one sub-U I such that the number of elements visually indicated in each sub-UI decreases with the number of sub-UIs that are displayed simultaneously on the display unit.

4. The method according to claim 1, further comprising:
selecting at least one component indicated by the UI by providing user input to the UI;
wherein generating at least one sub-UI comprises generating at least one sub-UI corresponding to respective ones of the selected at least one component.

5. The method according to claim 1, further comprising:
for each component of the plurality of components, retrieving the set associated therewith;
sensing change in operational state of at least one of the components by comparing the elements of the respective set associated with the at least one of the components with the elements of a previously retrieved set associated with said at least one of the components; and
on a condition that change has been sensed:
re-generating the sub-UI corresponding to the respective at least one of the components for which change in operational state has been sensed; and
re-displaying said sub-UI on the display unit.

6. A non-transitory computer-readable storage medium on which there is stored a computer program product adapted to, when executed in a processor unit, perform a method in a user interface, UI, of a process control system, the UI being configured to be displayed on an electronic visual display unit connectable to the process control system, the method comprising:
displaying visual indications of a plurality of components included in at least a part of a process controlled by the process control system on the display unit, each component of the plurality of components being associated with a set having a plurality of elements, each of which elements is associated with operation of the component;

generating at least one sub-UI, each sub-UI corresponding to a respective component of the plurality of components, each sub-UI being adapted to controllably visually indicate at least some of the elements of the set associated with the corresponding component and to enable a user to control an operational state of the corresponding component by means of user input provided to the sub-UI;

displaying the at least one sub-UI on the display unit within a predetermined region of the UI, the predetermined region configured to display exclusively the at least one sub-UI, wherein all of the at least one sub-UI of any number displayed in the UI completely fills the predetermined region;

generating and displaying at least two of the at least one sub-UI within the predetermined region;

adapting each of the at least one sub-UI such that the size of each of the at least one sub-UI as displayed on the display unit within the predetermined region of the UI decreases with the number of sub-UIs that are displayed simultaneously on the display unit; and adapting each of the at least one sub-UI such that a number of elements visually indicated in each sub-UI when the at least one sub-UI is displayed on the display unit depends on the number of sub-UIs that are displayed simultaneously on the display unit, and such that, for each of the at least one sub-UI, a number of available operations that can be performed on the corresponding component by means of user input provided to the sub-UI depends on the number of sub-UIs that are displayed simultaneously on the display unit.

7. A user interface device of a process control system, the user interface device comprising a processor that generates a user interface, UI, to be displayed on an electronic visual display unit connectable to the process control system, the user interface device being configured to:

visually indicate a plurality of components included in at least a part of a process controlled by the process control system, each component of the plurality of components being associated with a set having a plurality of elements, each of which elements is associated with operation of the component;

generate at least one sub-UI, each sub-UI corresponding to a respective component of the plurality of components, each sub-UI being adapted to controllably visually indicate at least some of the elements of the set associated with the corresponding component and to enable a user to control an operational state of the corresponding component by means of user input provided to the sub-UI;

display the at least one sub-UI on the display unit within a predetermined region of the UI, the predetermined region configured to display exclusively the at least one sub-UI, wherein all of the at least one sub-UI of any number displayed in the UI completely fills the predetermined region;

generate and display at least two of the at least one sub-UI within the predetermined region;

adapt each of the at least one sub-UI such that the size of each of the at least one sub-UI as displayed on the display unit within the predetermined region of the UI decreases with the number of sub-UIs that are displayed simultaneously on the display unit; and adapt each of the at least one sub-UI such that a number of elements visually indicated in each sub-UI when the at least one sub-UI is displayed on the display unit depends on the number of sub-UIs that are displayed simultaneously on the display unit, and such that, for each of the at least one sub-UI, a number of available operations that can be performed on the corresponding component by means of user input provided to the sub-UI depends on the number of sub-UIs that are displayed simultaneously on the display unit.

8. The user interface device according to claim 7, further comprising:
a communication module adapted to, for each component of the plurality of components, retrieve the set associated therewith; and
an operational state sensor adapted to sense change in operational state of at least one of the components by comparing the elements of the respective set associated with the at least one of the components with the elements of a previously retrieved set associated with said at least one of the components;
the UI being further adapted to, on a condition that change has been sensed by the operational state sensor:
re-generate the sub-UI corresponding to the respective at least one of the components for which change in operational state has been sensed; and
re-display said sub-UI on the display unit.

9. The user interface device according to claim 7, wherein the elements of the sets associated with the respective components are associated with control and/or monitoring of the respective components.

10. The user interface device according to claim 7, wherein the elements of the sets associated with the respective components include at least one of operational state of and available operations performable on the respective components.

11. A process control system comprising a user interface device according to claim 7.

* * * * *